United States Patent
Kheradmand et al.

(10) Patent No.: US 10,032,262 B2
(45) Date of Patent: Jul. 24, 2018

(54) BLOCK-BASED CONTENT-ADAPTIVE RESHAPING FOR HIGH DYNAMIC RANGE IMAGES

(71) Applicant: Dolby Laboratories Licensing Corporation, San Francisco, CA (US)

(72) Inventors: Amin Kheradmand, Sunnyvale, CA (US); Guan-Ming Su, Fremont, CA (US); Cheng-Chi Li, Urbana, IL (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/418,199

(22) Filed: Jan. 27, 2017

(65) Prior Publication Data

US 2017/0221189 A1 Aug. 3, 2017

Related U.S. Application Data

(60) Provisional application No. 62/334,099, filed on May 10, 2016, provisional application No. 62/290,399, filed on Feb. 2, 2016.

(51) Int. Cl.
*G06K 9/00* (2006.01)
*G06T 5/00* (2006.01)
(Continued)

(52) U.S. Cl.
CPC ............... *G06T 5/009* (2013.01); *G06T 5/20* (2013.01); *G06T 7/11* (2017.01); *G06T 7/90* (2017.01);
(Continued)

(58) Field of Classification Search
None
See application file for complete search history.

(56) References Cited

U.S. PATENT DOCUMENTS

| | | | |
|---|---|---|---|
| 8,019,150 B2 * | 9/2011 | Bezryadin | G06T 11/001 345/591 |
| 9,264,681 B2 | 2/2016 | Gish | |

(Continued)

FOREIGN PATENT DOCUMENTS

| | | |
|---|---|---|
| WO | 2009/127231 | 10/2009 |
| WO | 2014/204865 | 12/2014 |

(Continued)

OTHER PUBLICATIONS

Mittal, Gaurav, et al. "Bit-depth expansion using minimum risk based classification." Visual Communications and Image Processing (VCIP), 2012 IEEE. IEEE, 2012.*

(Continued)

*Primary Examiner* — Andrae S Allison

(57) ABSTRACT

A processor for signal reshaping receives an input image with an input bit depth. Block-based standard deviations are computed. The input codewords are divided into codeword bins and each bin is assigned a standard deviation value. For each bin, a standard deviation to bit-depth function is applied to the bin values to generate minimal bit depth values for each codeword bin. An output codeword mapping function is generated based on the input bit depth, a target bit depth, and the minimal bit depth values. The codeword mapping function is applied to the input image to generate an output image in the target bit depth.

14 Claims, 4 Drawing Sheets

(51) Int. Cl.
*G06T 5/20* (2006.01)
*G06T 7/11* (2017.01)
*G06T 7/90* (2017.01)

(52) U.S. Cl.
CPC ........... *G06T 2207/10016* (2013.01); *G06T 2207/10024* (2013.01); *G06T 2207/20008* (2013.01); *G06T 2207/20021* (2013.01); *G06T 2207/20024* (2013.01); *G06T 2207/20208* (2013.01)

(56) References Cited

U.S. PATENT DOCUMENTS

| | | | | |
|---|---|---|---|---|
| 9,716,887 | B2* | 7/2017 | Atkins | H04N 19/126 |
| 2013/0148029 | A1* | 6/2013 | Gish | G09G 5/02 |
| | | | | 348/708 |
| 2014/0247869 | A1* | 9/2014 | Su | H04N 19/30 |
| | | | | 375/240.03 |
| 2015/0071340 | A1* | 3/2015 | Andersson | H04N 19/136 |
| | | | | 375/240.02 |
| 2016/0134872 | A1* | 5/2016 | Su | H04N 19/176 |
| | | | | 375/240.03 |
| 2017/0140513 | A1* | 5/2017 | Su | G06T 5/007 |
| 2017/0221189 | A1* | 8/2017 | Kheradmand | G06T 5/003 |
| 2017/0308996 | A1* | 10/2017 | Kadu | G06T 5/002 |
| 2018/0041759 | A1* | 2/2018 | Froehlich | H04N 19/124 |

FOREIGN PATENT DOCUMENTS

| | | |
|---|---|---|
| WO | 2015/130541 | 9/2015 |
| WO | 2016/140954 | 9/2016 |

OTHER PUBLICATIONS

X. Jin, H. Han and Q. Dai, "Image Reshaping for Efficient Compression of Plenoptic Content," in IEEE Journal of Selected Topics in Signal Processing, vol. 11, No. 7, pp. 1173-1186, Oct. 2017.*

Taoran Lu, Fangjun Pu, Peng Yin, Jaclyn Pytlarz, Tao Chen, Walt Husak, Lu et al"Adaptive reshaper for high dynamic range and wide color gamut video compression," Proc. SPIE 9971, Applications of Digital Image Processing XXXIX, 99710B (Sep. 27, 2016).*

Pouli, Tania, and Erik Reinhard. "Progressive color transfer for images of arbitrary dynamic range." Computers & Graphics 35.1 (2011): 67-80.*

Tomaszewska, User Study in Non-static HDR Scenes Acquisition, ICCVG 2012, LNCS 7594, pp. 245-252, 2012. Verlag Berlin Heidelberg 2012 c Springer-Verlag Berlin Heidelberg 2012.*

Natale, D. et al "High Dynamic Range (HDR) Video Processing for the Exploitation of High Bit-Depth Sensors in Human-Monitored Surveillance" IEEE Applied Imagery Pattern Recognition Workshop, pp. 1-6, Oct. 14, 2014.

Pu, F. et al "Comments on Reshaping for HDR/WCG Compression" MPEG Meeting Oct. 2015, Geneva, Switzerland.

Stessen, J. et al "Chromaticity Based Color Signals for Wide Color Gamut and High Dynamic Range" MPEG Meeting, ISO/IEC JTC1/SC29/WG11, No. M35065, Oct. 1, 2014.

ITU-R BT.1886, "Reference Electro-Optical Transfer Function for Flat Panel Displays used in HDTV Studio Production" Mar. 2011, pp. 1-7.

SMPTE ST 2084:2014 "High Dynamic Range Electro-Optical Transfer Function of Mastering Reference Displays" Aug. 16, 2014, pp. 1-14.

* cited by examiner

BLOCK-BASED CONTENT-ADAPTIVE RESHAPING FOR HIGH DYNAMIC RANGE IMAGES

CROSS-REFERENCE TO RELATED APPLICATIONS

This application claims the benefit of the U.S. Provisional Patent Application Nos. 62/290,399, filed on Feb. 2, 2016, and 62/334,099, filed May 10, 2016, both of which are incorporated by references in their entirety.

TECHNOLOGY

The present invention relates generally to images. More particularly, an embodiment of the present invention relates to block-based content-adaptive reshaping of images with high dynamic range.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is included herein by reference in its entity, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range higher than SDR.

As used herein, the term "forward reshaping" denotes the process of mapping (or quantizing) an HDR image from its original bit depth to an image of a lower or the same bit depth to allow compressing the image using existing coding standards or devices. In a receiver, after decompressing the reshaped signal, the receiver may apply an inverse reshaping function to restore the signal to its original high dynamic range. As appreciated by the inventors here, improved techniques for image reshaping of high-dynamic range images are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Block-based, content-adaptive techniques for image reshaping of high dynamic range (HDR) images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to block-based image reshaping of HDR images. A processor for signal reshaping receives an input image with an input bit depth. The image is divided in to blocks and a metric of complexity of each block (such as, its standard deviation) is computed. The input codewords are divided into codeword bins and each bin is assigned a metric of complexity value. For each bin, a metric of complexity to bit-depth function is applied to the bin values to generate minimal bit depth values for each codeword bin. An output codeword mapping function is generated based on the input bit depth, a target bit depth, and the minimal bit depth values. The codeword mapping function is applied to the input image to generate an output image in the target bit depth.

In an embodiment, the measure of complexity comprises computing the standard deviation of image blocks.

Example Video Delivery Processing Pipeline

Figure 1A:
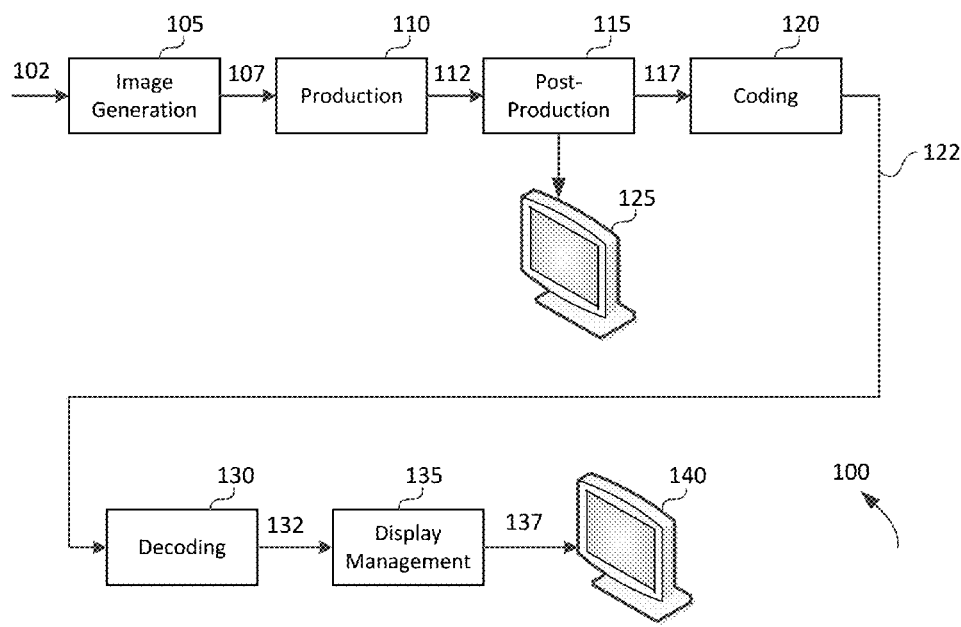
FIG. 1A depicts an example process for a video delivery pipeline.

FIG. 1A depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Reshaping

Currently, most digital interfaces for video delivery, such as the Serial Digital Interface (SDI) are limited to 12 bits per pixel per component. Furthermore, most compression standards, such as H.264 (or AVC) and H.265 (or HEVC), are limited to 10-bits per pixel per component. Therefore efficient encoding and/or quantization is required to support HDR content, with dynamic range from approximately 0.001 to 10,000 cd/m$^2$ (or nits), within existing infrastructures and compression standards.

The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model.

For example, under SMPTE ST 2084, at 1 cd/m$^2$, one 12-bit code value corresponds to a relative change of approximately 0.0048 cd/m$^2$; however, at 1,000 cd/m$^2$, one 12-bit code value corresponds to a relative change of approximately 2.24 cd/m$^2$. This non-linear quantization is needed to accommodate for the non-linear contrast sensitivity of the human visual system (HVS).

Another example of a perceptually-quantized EOTF is presented in "Chromaticity based color signals for wide color gamut and high dynamic range," by J. Stessen et al., ISO/IEC JTC1/SC29/WG11 MPEG2014/M35065, October 2014, which is incorporated herein by reference in its entirety.

Contrast sensitivity of the HVS does not only depend on luminance but also on masking characteristics of the image content (most particularly noise and texture), as well as the adaptation state of the HVS. In other words, depending on the noise level or the texture characteristics of an image, image content can be quantized with larger quantization steps than those predicted by PQ or gamma quantizers, because texture and noise mask quantization artifacts. The PQ quantization describes the best the HVS can do, which occurs when there is no noise or masking in the image. However, for many images (frames of a video), there is significant masking.

In addition to noise and texture masking, other characteristics of visual behavior, such as optical flare and local adaptation may also be taken into consideration to increase the level of quantization and allow representing HDR images at 10-bits or lower per color component. As used herein, the terms "Content-Adaptive PQ" or "Content-adaptive reshaping" denote methods to adaptively adjust the perceptually quantization of images based on their content.

Figure 1B:
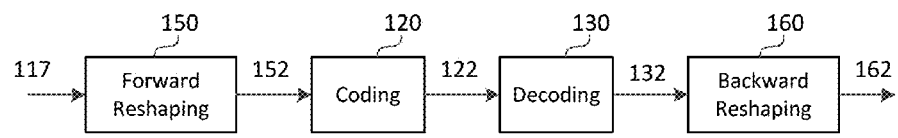
FIG. 1B depicts an example process for data compression using content-adaptive quantization or reshaping according to an embodiment of this invention.

FIG. 1B depicts an example process for content-adaptive reshaping according to an embodiment. Given input frames (117), a forward reshaping block (150) analyzes the input and the coding constrains and generates codeword mapping functions which map input frames (117) to re-quantized output frames (152). For example, input (117) may be gamma-coded or PQ-coded according to certain EOTF. In some embodiments, information about the reshaping process may be communicated to downstream devices (such as decoders) using metadata. Following coding (120) and decoding (130), decoded frames (132) may be processed by a backward reshaping function (160), which converts the re-quantized frames (132) back to the original EOTF domain (e.g., gamma or PQ), for further downstream processing, such as the display management process (135) discussed earlier. In some embodiments, the backward or inverse reshaping function (160) may be integrated with a de-quantizer in decoder (130), e.g., as part of the de-quantizer in an AVC or HEVC video decoder.

An example of a signal reshaping function was presented in U.S. Provisional Patent Application Ser. No. 62/126,925, filed on Mar. 2, 2015, "Content-adaptive perceptual quantizer for high dynamic range images," by J. Froehlich et al., which is incorporated herein by reference in its entirety, to be referred to as the '925 application, or the CAQ method. According to the CAQ method, the reshaping function is computed according to a noise mask histogram of the input image. Alternative, block-based reshaping techniques are described next.

Block-Based Reshaping

Figure 2:
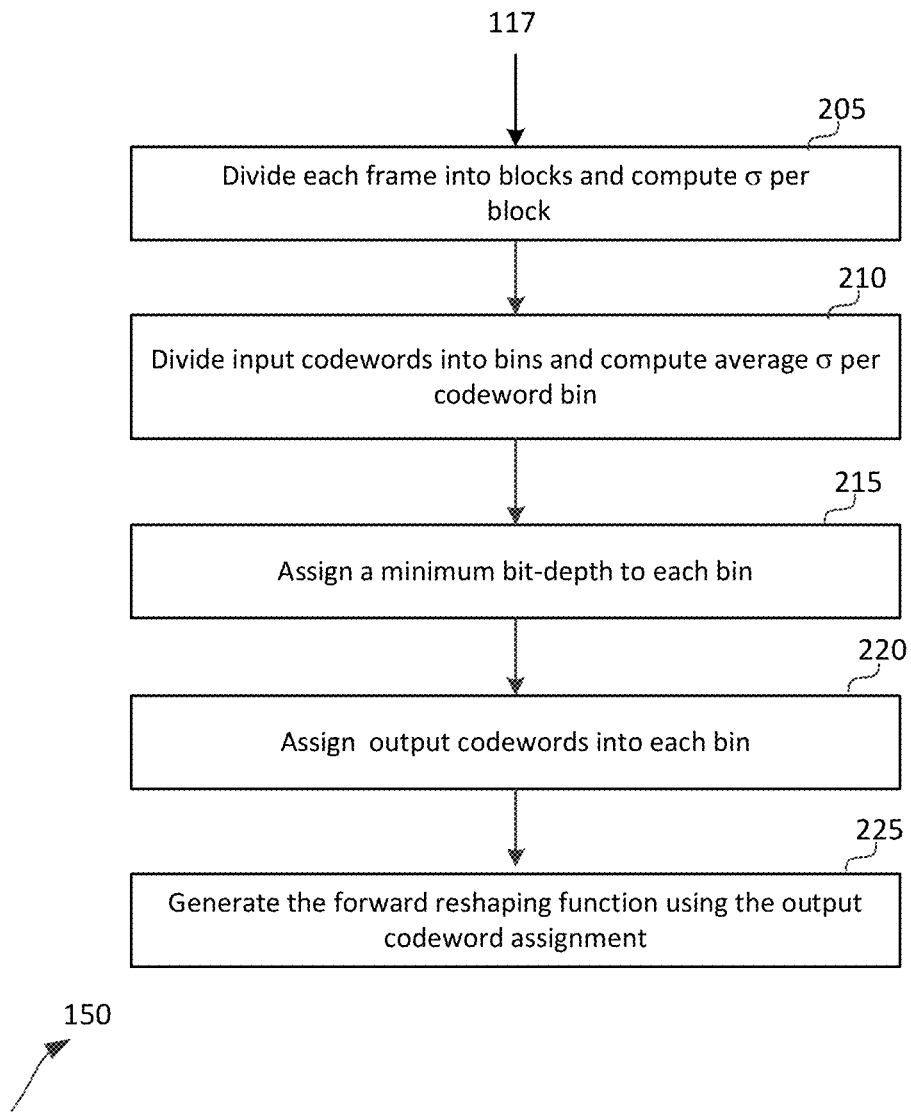
FIG. 2 depicts an example process for block-based, content-adaptive reshaping according to an embodiment of this invention.

FIG. 2 depicts an example process for block-based content-adaptive reshaping according to an embodiment of this invention. As depicted in FIG. 2, given a sequence of images (e.g., video frames) (117), in block (205), each image is divided into non overlapping blocks and the standard deviation ($\sigma$) for pixel values in each block is computed. In step (210), input codewords are divided into bins and the average standard deviation for each bin is computed. Block (215) computes the number of minimum bits required for each bin. Based on this information, in block (220), output codewords are assigned to each bin. Finally, in (225), a forward reshaping function is constructed based on the output codeword assignment. Each of these steps is described in more detail next.

In an embodiment, without limitation, let $I_j(p)$ denote the p-th pixel of a color component under quantization (e.g., luminance) in the j-th frame in the input sequence (117), normalized to [0 1). Let $v_{L_j}$ and $v_{H_j}$ denote the minimum and maximum pixel values in this frame, or $$v_{L_j} = \min\{I_j(p)\},$$

$$v_{H_j} = \max\{I_j(p)\}. \qquad (1)$$

Frame $I_j$ is divided into rectangular, non-overlapping blocks (e.g., into n×n blocks, where n=16). Denote the set of pixels within the k-th block as $\theta_{j,k} = \{p | p \in \text{block}(k)\}$. Then, the mean and standard deviation of the pixel values within the k-th, n×n, block may be computed as:

$$\text{mean}_{j,k} = \frac{\sum_{p \in \theta_{j,k}} I_j(p)}{n^2}, \qquad (2)$$

and $$\sigma_{j,k} = \text{std}_{j,k} = \sqrt{\left(\frac{\sum_{p \in \theta_{j,k}} I_j(p)^2}{n^2}\right) - \text{mean}_{j,k}^2}. \qquad (3)$$

In an embodiment, all pixels in the k-th block of the j-th frame are associated with the same standard deviation, $\text{Std}_{j,k}$. Let $H_j(p)$ denote the standard deviation of all pixels in the j-th frame. In an embodiment, in the process of designing a reshaping function for frame j some pixels in $H_j(p)$ may be excluded. These pixels may include:

Pixels of a letterbox area within the input image (that is, dark areas added to a picture so its size matches a certain aspect ratio). Pixels in letterbox areas have constant values, hence zero standard deviation.

Pixels at the right- and bottom-ends of the frame. If the size of the picture does not accommodate an integer number of the n×n blocks, then pixel areas at the right- and bottom-ends of the frame, where their corresponding blocks have a smaller size, may be excluded.

Let $\Omega_j$ denote the set of valid (not excluded) pixel indices for the j-th frame. Let i be an index inside $\Omega_j$. Then, $$H_j(i), i \in \Omega_j \qquad (4)$$

denotes the set of valid standard deviations for all pixels in the j-th frame. Experimental results indicate that standard deviation maps provide a good, and simple to compute, representation of the underlying frequency content in each frame and thus can be used to decide how to allocate different bit depths to different regions in each frame. However, the methods described herein are equally applicable using alternative metrics of the complexity of an image block, such as their variance, their entropy, frequency response, and the like.

Let $B_I$ denote the bit-depth of the input image (117) (e.g., $B_I = 16$) and let $K = 2^{B_I}$, then the dynamic range 0 to K−1 may be partitioned into M bins of equal number (W) of input codewords, that is W=K/M. Let $b_{j,m}$ denote the average standard deviation of all valid pixels with input values belonging to the m-th bin, where m=0, 1, . . . , M−1. That is, for $I_j(i)$, $i \in \Omega_j$, if $$\Psi_{j,m} = \left\{ i \,\middle|\, \frac{m}{M} \le I_j(i) < \frac{m+1}{M} \right\}, \qquad (5)$$

then

-continued $$b_{j,m} = \text{mean } \{H_j(i) \mid i \in \Psi_{j,m}\}. \qquad (6)$$

Note that for specific images there might exist some codeword bins with no pixels inside them. These bins may be marked so that they can be properly accounted for and/or adjusted in the next step.

Signal reshaping functions may be generated at the frame level or at the scene level. As used herein, the terms 'scene' or 'shot' for a video sequence may relate to a series of consecutive frames in the video signal sharing similar color and dynamic range characteristics. Because of the consecutive nature of video prediction in most video compression formats, it may be preferable to adjust the quantization parameters only at boundaries that match the typical boundaries of a video encoder, such as scene changes or a new group of pictures (GOP). Thus, given a scene with F frames and frame-based $b_{j,m}$ values, a scene-based measure of the standard deviation in each bin may be derived as $$b_m = \text{mean}\{b_{j,m}|j=0,1,\ldots,F-1\}. \qquad (7)$$

Figure 3:
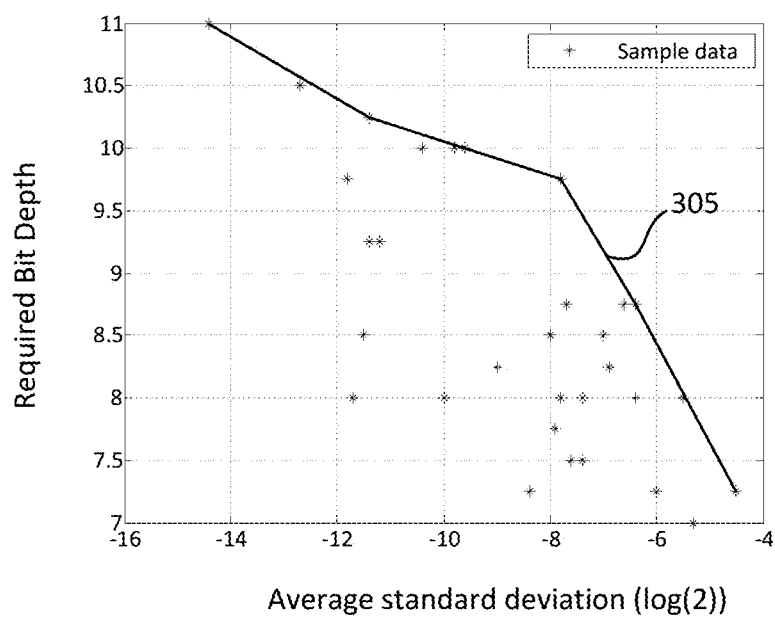
FIG. 3 depicts an example of a mapping function which maps average standard deviation values to required signal bit depth according to an embodiment of this invention.

For bins with no valid pixel values within a whole scene, in an embodiment, their standard deviation is set to a large number (say, 1 or higher) to guarantee that that no codewords are assigned to them. In another embodiment, let $v_L$ and $v_H$ denote the minimum and maximum pixel values within a scene, that is:

$$v_L = \min\{v_{Lj}\},$$

$$v_H = \max\{v_{Hj}\}, \qquad (8)$$

then for empty bins, the following process may be employed:
- If the luminance values in a bin are lower than $v_L$, then assign to this bin the same average standard deviation value as the closest bin to the right
- Else, if the luminance values in a bin are higher than $v_H$, then assign to this bin the same average standard deviation value as the closest bin to the left
- Else, interpolate the bin value from its neighbor bins Minimum Bit-Depth Per Bin Given the computed $b_m$ levels for a scene, the next step would be to determine the number of bits that need to be allocated for each bin. In an embodiment, such a mapping may be determined based on experimental user study results. For example, in one such study, users were shown to evaluate test images constructed as follows:

a) A selection of 16-bit HDR frames was converted from the original RGB space to the color space to be used during the compression step (120)
b) The color-transformed images were truncated (starting from the least significant bit (LSB)) to bit depths ranging from 7 bits to 11 bits
c) The LSB-truncated images were converted back to the RGB color space
d) Then, for each image, the minimum required bit-depth for which the output image does not exhibit any artifacts, such as false contouring, was determined FIG. 3 depicts an example of such results for a set of video data coded according to ST 2084. In FIG. 3, curve (305) represents the worst case results for the tested images, thus representing the worst-case bit-depth requirements as a function of computed average standard deviation. From FIG. 3, for example, for an average standard deviation of $2^{-8}$, the required bit depth is about 9.75 bits. As expected, FIG. 3 indicates that image regions with higher levels of complexity can be coded at smaller bit depths. Alternatively, the smoother the image, the more bit depth is needed for an accurate and perceptually lossless representation.

Given a set of average standard deviation values, $\text{std}_i$, $i=0, 1, 2, \ldots, N-1$, where $\text{std}_i \leq \text{std}_{i+1}$, let $\tilde{Q}_i$ denote the corresponding computed minimum bit depth. Based on these samples, one may derive a standard deviation to bit-depth allocation function $f_B(\,)$ so that $$Q_m = f_B(b_m), \qquad (9)$$

In an embodiment, $f_B(\,)$ can be a piece-wise linear function computed using linear interpolation. For example, for $$\text{std}_n \leq b_m \leq \text{std}_{n+1} \qquad (10)$$

$$Q_m = \tilde{Q}_n - (\tilde{Q}_n - \tilde{Q}_{n+1})\frac{b_m - \text{std}_n}{\text{std}_{n+1} - \text{std}_n}.$$

However, other interpolation techniques known in the art, such as bilinear interpolation, spline interpolation, and the like, could also be used.

In an embodiment, it may be more convenient to perform codeword mapping (220) based on the number of required codewords within each bin instead of using the bit depth data directly. This is examined in the next section.

Codeword Mapping Generation

Let $B_T$ denote the target bit-depth for the re-quantized signal (152) (e.g., $B_T=10$ bits/pixel per color component), then the output will be mapped using $2^{B_T}$ codewords. In an embodiment, the range of codewords is normalized to be in [0, 1), hence let $$D_m = \left(\frac{2^{Q_m}}{2^{B_T}}\right) \bigg/ 2^{B_I}. \qquad (11)$$

denote the number of required normalized codewords per bin m. For example, if $Q_m=9$, $B_I=16$ and $B_T=10$, then $D_m=2^{-17}$.

Let $$d_i = D_m \text{ for } (m-1)W \leq i < mW, \qquad (12)$$

denote the number of normalized codewords per input $i \in (0, 2^{B_I}-1)$, then $d_i$ can be considered a lower bound for the number of required codewords per input codeword. The total number of normalized codewords for all output codewords, D, is bounded by 1, or $$D = \sum_{i=v_L}^{v_H} d_i \leq 1. \qquad (13)$$

Let $U=1-D$ denote the number of unused normalized codewords after applying equation (12). These unused codewords need to be reassigned to output codewords according to a given criterion. In an embodiment, using a constant allocation scheme, for input $v_L \leq i \leq v_H$, the same amount of additional codewords are assigned based on the existing distribution, or $$\tilde{d}_i = d_i + \frac{U}{v_H - v_L}, \qquad (14)$$

where $\tilde{d}_i$ denotes the updated number of normalized codeword values. Additional reallocation techniques were also presented in the '925 application. In this invention, another codeword allocation scheme based on computed entropy is also proposed as follows.

Consider a region $\Omega_i$ surrounding the i-th pixel in the j-th frame (e.g., a 5×5 area with the i-th pixel in the center), then the entropy of the i-th pixel may be computed as $$E_j(i) = \sum_{k \in \Omega_i} -p(k)\log(p(k)), \qquad (15)$$

where p(k) denotes an empirical probability for the occurrence of pixel value k. For example:

$$p(k) = \frac{|\{y = k \mid y \in \Omega_i\}|}{|\Omega_i|},$$

where |X| denotes the number of elements in set X.

Without loss of generality, in an embodiment, let $$E_j^{(NL)}(i) = E_j(i)^{1/2} \qquad (16)$$

represent a non-linear mapping of the entropy values so that more codewords are allocating to regions of higher complexity while smoother areas, with low entropy, are also guaranteed not to get too few codewords, thus preventing coding artifacts. After normalizing with the maximum entropy value within each frame, the final entropy of the j-th frame is given by $$E_j^{(NL)}(i) = E_j^{(NL)}(i) \Big/ \max_i E_j^{(NL)}(i). \qquad (17)$$

Let denote the mean entropy within each codeword bin m in the j-th frame, and let $E_m = \text{mean}(E_{j,m} | j=0, 1, \ldots, F-1)$ denote the average entropy in each codeword bin within a scene, then, in an embodiment, for $v_L \leq i \leq v_H$, unused codewords are allocated based on $$\tilde{d}_i = d_i + a\left(\frac{U}{v_H - v_L}\right) + (1-a)\left(\frac{e_i}{S_e}\right), \qquad (18)$$

where a is a constant between 0 and 1 (e.g., a=0.1) that determines what proportion of the unused codewords is assigned using a constant allocation scheme, e.g., as in equation (14), and what proportion takes into consideration the computed entropy values, $$e_i = E_m \text{ for } (m-1)W \leq i < mW, \qquad (19)$$

and $$S_e = \Sigma_i e_i \text{ for } v_L \leq i \leq V_H. \qquad (20)$$

In another embodiment, let $$u_i = U \cdot \left(\frac{i - v_L}{v_H - v_L}\right)^\alpha, \text{ for } v_L \leq i \leq v_H, \qquad (21)$$

where α is a constant (e.g. α=1.4). Then, unused codewords are allocated based on $$\tilde{d}_i = d_i + (u_i - u_{i-1}), \text{ for } v_L + 1 \leq i \leq V_H. \qquad (22)$$

Experimental results have indicated that this allocation scheme tends to preserve better film grain, camera noise, or details at certain high bit rates.

In an embodiment, the allocation curves may also be smoothed using a low-pass filter or a moving average filter to ensure the curve is smooth and the inverse reshaping function is easy to approximate using a piece-wise polynomial. For example, in an embodiment $$\tilde{s}_i = \sum_{k=-W}^{W} a_k \cdot \tilde{d}_{i+k}, \qquad (23)$$

where $$a_k = \frac{1}{2W + 1}.$$

In an embodiment, no codewords are assigned to values outside the $(v_L, v_H)$ range, or $\tilde{s}_i = 0$ for $i < v_L$ and $i > v_H$.

Furthermore, in case the sum of smoothed values exceeds 1, the codeword assignment needs to be normalized. For example, if $$S = \sum_{i=v_L}^{v_H} \tilde{s}_i > 1, \qquad (24)$$

then $$s_i = \frac{\tilde{s}_i}{S}.$$

Given the final allocation of codewords in each codeword bin, a forward reshaping function may be generated as $$FL(i) = \sum_{k=0}^{i} s_k. \qquad (25)$$

Given FL(i), then, in the j-th frame, for a given input pixel $I_j(p)=i$ ($i \in (0, 2^{B_I}-1)$) the final, normalized, re-quantized pixel value $s_{jp}$ may be expressed as:

$$s_{jp} = \begin{cases} 0, & \text{if } i < v_L \\ 1, & \text{if } i > v_H \\ FL(i), & \text{if } v_L \leq i \leq v_H \end{cases} \qquad (26)$$

In an embodiment, FL(i) values may be stored in a pre-computed look-up table (LUT). Alternatively, normalized $s_{jp}$ values may also be mapped to de-normalized values in the range 0 to $2^{B_T}-1$.

Figure 4:
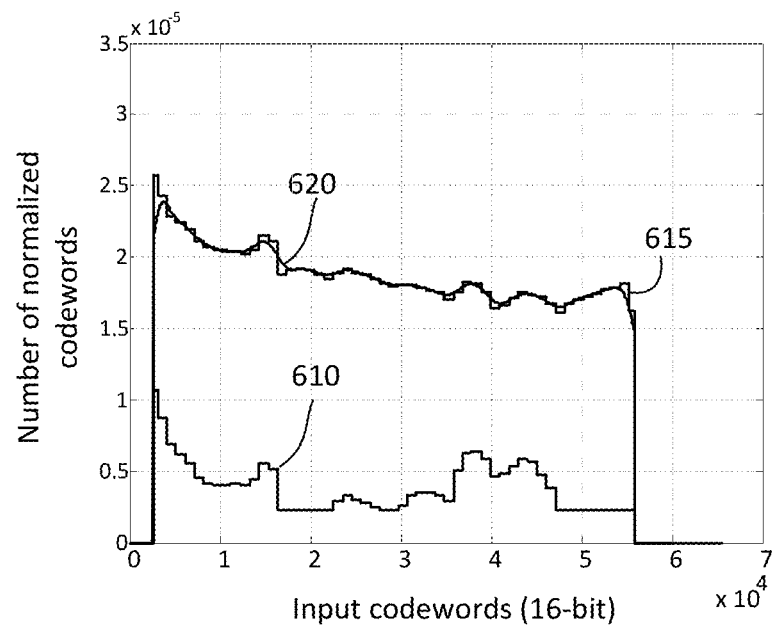
FIG. 4 depicts examples of computed normalized codeword allocations according to embodiments of this invention.

FIG. 4 depicts example plots for codeword allocation according to embodiments. Plot (610) shows the original allocation based on the computed lower bit-depth values (e.g., using equation (12)) for a scene, for $B_T=16$ (input codewords range from 0 to 65,535). FIG. 4 also shows the number of normalized codewords after the final allocation, using both smoothed (620) and unsmoothed (615) curves.

Figure 5:
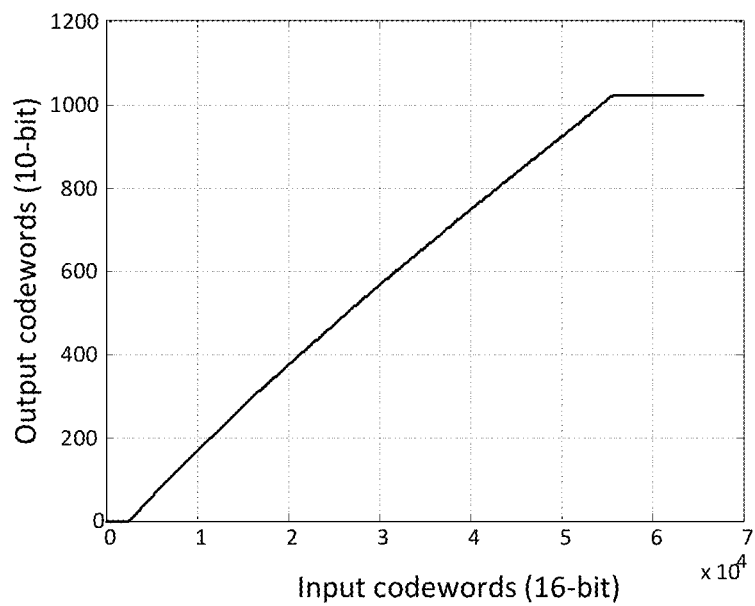
FIG. 5 depicts an example of a forward reshaping function computed according to an embodiment of this invention.

FIG. 5, depicts an example look-up table for reshaping 16-bit input data into 10-bit output data according to embodiments of this invention.

People skilled in the art will appreciate that while the methods discussed herein are based on a block-based measure of standard deviation, other measures of block complexity, such as their variance, entropy (for example, as computed in equation (15)), frequency transform components, and the like, may also be applied.

Backward or Inverse Reshaping

In some embodiments, backward reshaping (160) may be applied to reverse the effects of forward reshaping (150). In an embodiment, a look-up table for inverse quantization may be constructed as follows:

a) For each codeword in the quantized domain ($s_c$), identify all input codewords ($v_i$) for which $FL(v_i)=s_c$. Let this group be denoted as $\omega(s_c)=\{v_i|FL(v_i)=s_c\}$; then b) Construct the backward reshaping function ($BL(s_c)$) as a function of $\omega(s_c)$.

For example, in an embodiment, without limitation, $BL(s_c)$ may be constructed as the average of all codewords that belong to $\omega(s_c)$, or if $|\omega(s_c)|>0$, then $$BL(s_c) = \frac{\sum_{i \in \omega(s_c)} v_i}{|\omega(s_c)|}, \quad (27)$$

where $|\omega(s_c)|$ denotes the number of elements in the set $\omega(s_c)$. If $|\omega(s_c)|=0$ for any $s_c$ values, in an embodiment, these values may be interpolated from its neighbor non-zero values. In another embodiment, backward reshaping may be defined as $\min(\omega(s_c))$.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the block-based reshaping of images with enhanced dynamic range, such as those described herein. The computer and/or IC may compute any of a variety of parameters or values that relate to the block-based reshaping processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to block-based reshaping of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient block-based reshaping of HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for adaptive image reshaping with a processor, the method comprising:
    accessing with a processor an input image in an input bit depth;
    dividing the input image into a plurality of blocks and computing for one or more image blocks a measure of complexity of their pixel values;
    dividing a range of input codewords into a plurality of codeword bins;
    for one or more of the codeword bins:
        computing a bin measure of complexity value based on the block measures of complexity of at least the input image;
        applying a measure of complexity to bit-depth function to generate a minimal bit-depth value;
    generating a codeword mapping function based on the input bit depth, the minimal bit depth values, and a target bit depth, wherein the codeword mapping function maps input codewords in the input bit depth to output codewords in the target bit depth and wherein generating the codeword mapping function further comprises:
    for each codeword bin:
        generating a lower bound of normalized number of required codewords in the target bit depth based on the minimal bit depth values, the input bit depth and the target bit depth;

allocating unused normalized codewords to each bin image according to an allocation scheme to generate updated normalized numbers of required codewords; and generating the codeword mapping function by computing a cumulative sum of the updated normalized numbers of required codewords, wherein generating the codeword mapping function for an input pixel value i comprises computing $$FL(i) = \sum_{k=0}^{i} s_k,$$

wherein $s_k$ values are derived based on the updated normalized number of codeword values; and applying the codeword mapping function to the input image to generate an output image in the target bit depth.

2. The method of claim 1, wherein computing the measure of complexity of pixel values in a block comprises computing the standard deviation of the pixel values in the block.

3. The method of claim 1, further comprising:
applying a pixel selection process to the input image to eliminate computing block measures of complexity for pixels in a letterbox area of the input image.

4. The method of claim 1 wherein the input image is a high dynamic range image encoded according to gamma encoding or SMPTE ST 2084.

5. The method of claim 1, wherein the measure of complexity to bit-depth function is generated according to results from a perceptual user study.

6. The method of claim 5, wherein the perceptual user study comprises:
accessing a plurality of original high dynamic range (HDR) images in the input bit depth;
for each original image in the plurality of high dynamic range images:
converting the original image from its original color space to a second color space;
truncating the image in the second color space to generate truncated images at bit depths lower than the input bit depth;
converting the truncated images to the original color space to generate reconstructed images; and
determining the lower bit-depth for which one of the truncated images in the original color space best matches the original image.

7. The method of claim 1, further comprising, filtering the updated normalized numbers of required codewords by a low-pass filter before generating the codeword mapping function.

8. The method of claim 1, wherein the allocation scheme comprises a constant offset allocation scheme, where for the i-th input pixel value $$\tilde{d}_i = d_i + \frac{U}{v_H - v_L},$$

wherein $\tilde{d}_i$ denotes the updated normalized number of codeword values, $d_i$ denotes the normalized number of required codewords, if D denotes the sum of $d_i$ values, then U=1−D, $v_H$ denotes a maximum input pixel value, and $v_L$ denotes a minimum input pixel value.

9. The method of claim 1, wherein the allocation scheme comprises computing $$\tilde{d}_i = d_i + (u_i - u_{i-1}), \text{for } v_L + 1 \leq i \leq v_H$$

wherein $\tilde{d}_i$ denotes the updated normalized number of codeword values, $d_i$ denotes the normalized number of required codewords, if D denotes the sum of $d_i$ values, then U=1−D, $v_H$ denotes a maximum input pixel value, $v_L$ denotes a minimum input pixel value, and $$u_i = U \cdot \left(\frac{i - v_L}{v_H - v_L}\right)^\alpha, \text{ for } v_L \leq i \leq v_H, \qquad (1)$$

where α is a constant.

10. The method of claim 1, wherein the allocation scheme comprises an entropy-based allocation scheme, where for the i-th input pixel value $$\tilde{d}_i = d_i + a\left(\frac{U}{v_H - v_L}\right) + (1 - a)\left(\frac{e_i}{S_e}\right),$$

wherein $\tilde{d}_i$ denotes the updated normalized number of codeword values, $d_i$ denotes the normalized number of required codewords, if D denotes the sum of $d_i$ values, then U=1−D, a is a scalar between 0 and 1, $v_H$ denotes a maximum input pixel value and $v_L$ denotes a minimum input pixel value, $e_i$ denotes a measure of local entropy for the i-th codeword, and $S_e = \Sigma_i e_i$ for $v_L \leq i \leq v_H$.

11. The method of claim 1, wherein generating the output image comprises computing:

$$s_p = \begin{cases} 0, & \text{if } i < v_L \\ 1, & \text{if } i > v_H \\ FL(i), & \text{if } v_L \leq i \leq v_H \end{cases},$$

wherein for a pixel $I_p = i$ in the input image, $s_p$ denotes the corresponding, normalized, quantized output pixel, $v_H$ denotes a maximum input pixel value, and $v_L$ denotes a minimum input pixel value.

12. The method of claim 1, wherein the bin measures of complexity values are computed based on block complexity values computed across multiple consecutive frames in a video scene that includes the input image.

13. An apparatus comprising a processor and configured to perform the method recited in claim 1.

14. A non-transitory computer-readable storage medium having stored thereon computer-executable instruction for executing a method with one or more processors in accordance with claim 1.

* * * * *